Nov. 20, 1956  J. H. BOOTH ET AL  2,771,302
STEERING ARM, SPINDLE AND SUPPORT BRIDGE ASSEMBLY
Filed May 2, 1951  2 Sheets-Sheet 1
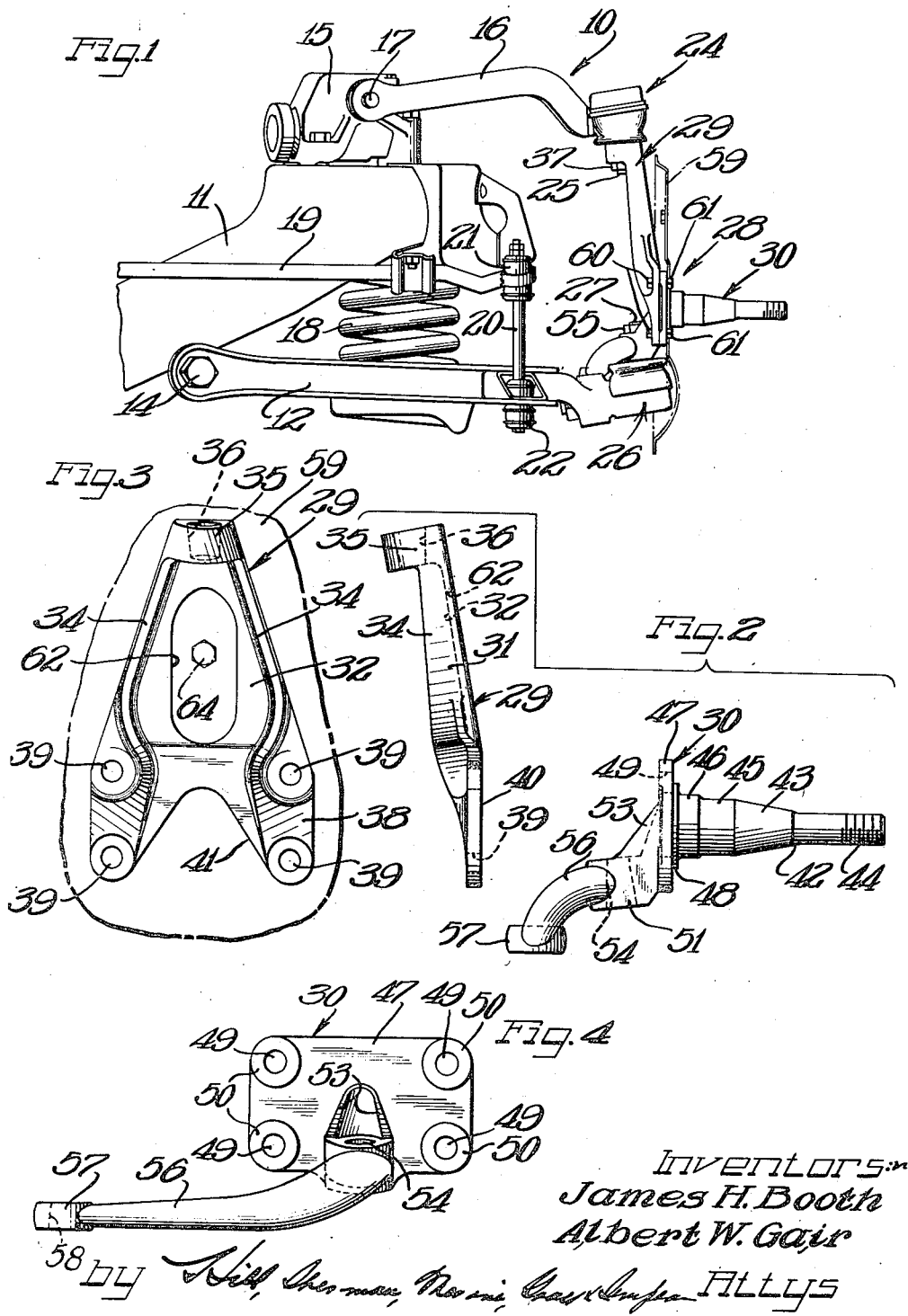

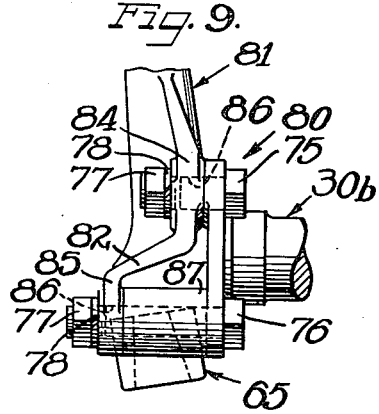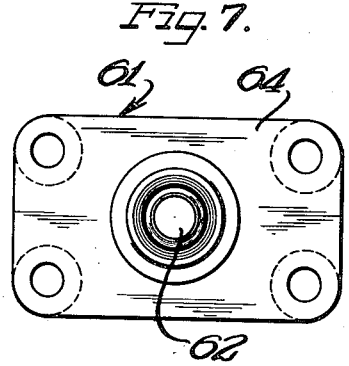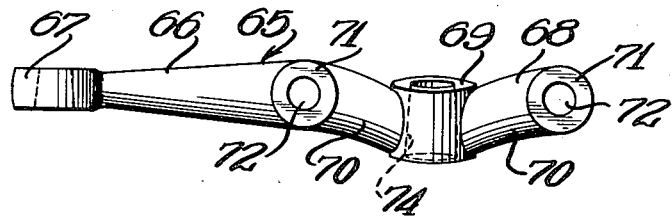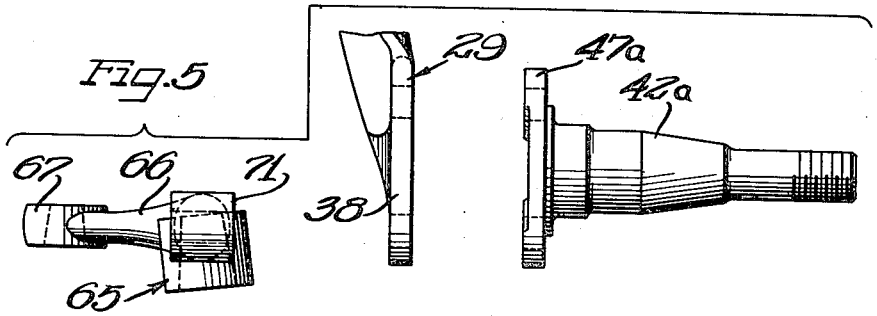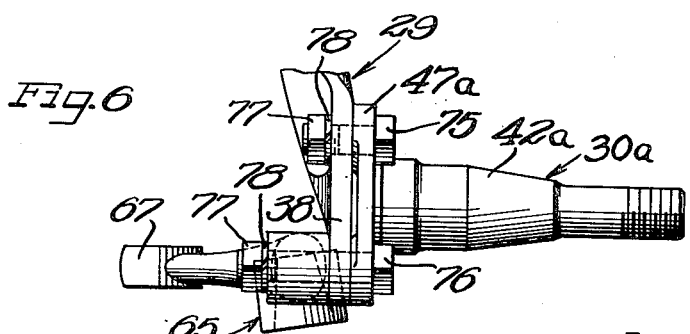

United States Patent Office 2,771,302
Patented Nov. 20, 1956

2,771,302

STEERING ARM, SPINDLE, AND SUPPORT BRIDGE ASSEMBLY

James H. Booth, Venice, and Albert W. Gair, Fraser, Mich., assignors to Thompson Products, Inc., Cleveland, Ohio, a corporation of Ohio Application May 2, 1951, Serial No. 224,172

5 Claims. (Cl. 280—96.2)

This invention relates to an improved steering knuckle construction for use in an independent steerable wheel suspension in a vehicle. More particularly, the invention relates to an improved and simplified steering knuckle assembly in which a separable spindle support bridge contains integral means at one end for pivotally attaching to the upper control arm of an independent wheel suspension and in which a separable wheel support spindle structure is fixedly attached to the support bridge and contains integral means for pivotally attaching to the lower control arm of the wheel suspension.

The steering knuckle assembly of the present invention comprises separable components which may be easily mass produced at a minimum cost. In addition, the components are arranged for expeditious assembly into the completed steering knuckle.

According to this invention an independent steerable wheel suspension, including upper and lower control arms pivotally mounted on an automobile frame and ball joints provided at the outer end of the control arms, has a spindle support bridge fixedly attached to the stud of the upper ball joint for pivoting of the support bridge relative to the upper control arm. An integral attachment pad is provided at the lower end of the support bridge for fixedly securing to an attachment pad of a wheel support spindle structure. An integral spindle extends outwardly at right angles to the spindle structure attachment pad and is provided with means for rotatably securing a vehicle wheel. A lower boss is affixed to the spindle structure attachment pad by being formed integral therewith or by being provided with means for fixedly securing it thereto. In either form of the lower boss, an integral steering arm may be extended therefrom for attaching to the steering linkage of the vehicle. The lower boss is fixedly secured to the stud of the lower ball joint for pivoting of the steering knuckle with respect to the lower control arm.

Ready access is provided to the face of a brake backing plate attached to the steering knuckle either by forming a relatively large access opening through the web of one form of the support bridge or by forming the central portion of the support bridge in semi-circular cross-section to prevent substantial obstruction to access. A generally V-shaped notch is provided in the support bridge attachment pad affording access clearance about the lower attachment boss. In one embodiment the support bridge attachment pad has an offset portion for fixedly receiving a separable lower boss between the offset portion and a portion of the spindle structure attachment pad.

It is, therefore, an object of the present invention to provide an improved steering knuckle assembly for use in an independent wheel suspension.

Another object of the invention is to provide a simplified steering knuckle assembly including a separable spindle support bridge and a wheel support spindle support structure detachably secured thereto in a simplified manner.

A further object of the invention is to provide an improved steering knuckle assembly including efficient means for fixedly securing an upper control arm spindle support bridge to a lower control arm spindle structure.

Still another object of the present invention is to provide a steering knuckle construction for an independent steerable wheel suspension in which the components are easily and inexpensively formable.

A still further object of the invention is to provide a steering knuckle assembly including a spindle support bridge and a wheel support spindle structure including a lower boss affixed thereto with access clearance provided between the support bridge and the lower boss.

A specific object of the invention is to provide an improved steering knuckle assembly including a simplified spindle support bridge for pivotally attaching to the upper control arm of an independent wheel suspension and a separable wheel support spindle structure including an attachment pad, an integral spindle shank, a fixedly secured lower boss for pivotally connecting to the lower control arm of the wheel suspension and a steering arm integral with the boss.

Other objects, features and advantages of the present invention will be apparent from the following detailed description of various embodiments, by way of preferred examples only, taken in conjunction with the accompanying drawings.

On the drawings:

Figure 1 is a fragmentary front elevational view of an independent steerable wheel suspension for a vehicle including a steering knuckle assembly according to the present invention;

Figure 2 is an enlarged exploded front elevational view of the steering knuckle assembly of Fig. 1 less the attachment bolts;

Figure 3 is an inside elevational view of the spindle support bridge shown in Figure 2 showing a broken away portion of the brake backing plate with a bolt in position for removal through a spindle support access opening;

Figure 4 is an inside end elevational view of the wheel support spindle structure shown in Figure 2;

Figure 5 is an enlarged exploded front elevational view similar to Figure 2, but showing an alternate form of the steering knuckle assembly;

Figure 6 is a fragmentary assembled front elevational view of the steering knuckle assembly according to Figure 5;

Figure 7 is an outside end elevational view of the wheel support spindle structure of Figures 5 and 6;

Figure 8 is an inside elevational view of the separable steering arm member shown in Figures 5 and 6;

Figure 9 is a fragmentary front elevational view similar to Figure 6, but showing an alternate form of the steering knuckle assembly.

As shown on the drawings:

In Figure 1 is shown an independent steerable wheel suspension 10 of an automobile or the like including a cross frame member 11 and a lower control arm or load carrying arm 12 pivotally attached at its inner end portion to the frame member 11 by means of an attachment bolt 14. A shock absorber 15 is fixedly mounted on the upper side of the end portion of the cross frame member 11. An upper control arm 16 is pivotally and operatively attached at its inner end portion, as at 17, to the shock absorber 15. A coil support spring 18 is operatively disposed between the lower control arm 12 and the cross frame member 11 to resiliently transmit the weight of the automobile body (not shown) from the frame member 11 to the load carrying arm 12 and thence to a wheel (not shown). A torsion rod 19 is connected at one end portion to the lower control arm 12 outwardly of the spring 18 by means of a link 20 and associated attachment means 21 and 22.

A ball joint 24, of the controlled friction dampening type, has its casing fixedly attached to the outer end portion of the upper control arm 16 and has a stud 25 tiltably and rotatably retained in the ball joint with an attachment portion extending downwardly therefrom. An anti-friction load carrying ball joint 26 has its casing fixedly attached at the outer end portion of the lower control arm 12 and has a stud 27, tiltably and rotatably retained in the ball joint with an attachment portion extending upwardly therefrom. The studs 25 and 27 are in axial alignment.

According to the present invention, the steering knuckle assembly 28 includes a spindle support bridge 29 and a separable wheel support spindle structure 30, both preferably formed of forged steel or the like. The support bridge 29 has a body portion 31 including a web 32 and a pair of integral longitudinal reinforcement flanges or ribs 34. An integral attachment boss 35 is formed at the upper end of the body portion 31 and extends substantially perpendicularly inwardly with respect to the web 32. A longitudinally inwardly tapered stud attachment hole 36 is formed through the upper attachment boss 35. The tapered attachment hole 36 is adapted to receive a mating tapered portion (not shown) on the ball joint stud 25 for locking the stud in the tapered hole by means of a stud attachment nut 37.

An integral attachment pad 38 of roughly rectangular plan form is formed at the lower end of the spindle support bridge 29 and is provided with two pairs of bolt apertures 39 formed therethrough. An outwardly exposed face 40 is afforded by the attachment pad with the plane of the face roughly parallel to the axis of the tapered hole 36, the small angle therebetween being the "king pin angle." A V-shaped clearance or cutout 41 is formed in the lower margin of the attachment pad 38 between the two pairs of bolt apertures 39.

As shown in Figures 2 and 4, the wheel support spindle structure 30 comprises an elongated spindle shaft 42 with a tapered portion 43 and a reduced diameter externally threaded end portion 44 for receiving a wheel retaining nut (not shown). Inwardly of the tapered portion 43 is provided a cylindrical portion 45 succeeded inwardly by an increased diameter cylindrical portion 46. An integral attachment pad 47 of rectangular form is formed at the inner end of the shaft 42 perpendicular thereto and has an outwardly facing circular embossment 48 between the pad and the cylindrical portion 46. Four bolt holes or apertures 49 are provided through the attachment pad 47 in the same pattern as the bolt apertures 39 in the bridge attachment pad 38. Integral upstanding annular bosses 50 are provided on the inward face of the attachment pad 47 about the bolt apertures 49 to provide bearing pads thereabout.

The spindle structure 30 is formed with an integral lower attachment boss 51 extending inwardly from the inward face of the attachment pad 47 and generally perpendicular thereto, with the small angular deviation from perpendicular being equal to the "king pin angle." A pair of spaced reinforcement webs 53, 53 extend between the upper portion of the boss 51 and the face of the pad 47. A tapered stud attachment hole 54 is formed through the lower boss 51 and is adapted to receive a mating tapered portion (not shown) on the ball joint stud 27 in axial alignment with the upper stud 25. A nut 55 serves to secure the stud in the hole 54. An integral steering arm 56 extends generally rearwardly from the lower boss 51 and has an attachment portion 57 at the free end including a tapered hole 58 for fixedly receiving a tapered portion of an attachment pin (not shown) which is pivotally attached in the tie rod linkage (not shown) of the vehicle.

In order to provide a brake support structure for a wheel (not shown) mounted on the wheel support spindle structure 30, a brake backing plate 59 (shown in phantom outline) is adapted for mounting against the outward face of the spindle attachment pad 47. As shown in Figure 1, the spindle support bridge 29, the spindle structure 30 and the brake backing plate 59 are assembled and secured together by pin means herein shown as mounting bolts 60 inserted through the mating bolt apertures 39 and 49 and provided with nuts 61.

For providing free access to the face of the brake backing plate 59 opposing the web 32 of the support bridge 29, a longitudinally elongated access aperture or opening 62 is formed through the web. Thus, elements lying between the brake backing plate 59 and the web 32, such as a brake mechanism bolt 64, may be easily reached for adjustment or removal without necessitating removal of the brake backing plate 59 from the steering knuckle assembly and without the use of a special wrench or the like.

In the embodiment of the invention shown in Figures 5 through 8, inclusive, a steering knuckle assembly (Fig. 6) is provided with the same spindle support bridge 29, but with a modified wheel support spindle structure 30a. The spindle structure 30a comprises a spindle shaft 42a, similar to the spindle shaft 42, and an integral attachment pad 47a, similar to the attachment pad 47. However, instead of forming the spindle structure with an integral lower boss and steering arm as shown in Figures 1–4, inclusive, a separable steering arm member 65 is provided and includes a steering arm 66 with an attachment portion 67 and an integral lower attachment boss portion 68.

The lower boss portion 68 includes an attachment boss 69 of circular plan form and a pair of oppositely extending integral arms 70, 70 having attachment portions 71, 71 formed with bolt holes or apertures 72, 72 therethrough. A tapered stud-receiving aperture or hole 74 is formed through the boss 69 roughly perpendicular with respect to the axes of the bolt apertures 72, with the small deviation from perpendicular being equal to the "king pin angle." The bolt apertures 72 are arranged for axial alignment with the lower pair of bolt apertures 39 formed through the bridge attachment pad 38. Pin means such as bolts 75 and 76 extend through the upper pair of mating apertures and the lower pair of mating apertures, respectively, and are secured therein by means of nuts 77 and lock washers 78. Thus, the attachment pads 38 and 47a are fixedly secured as described in connection with Figure 1 while the steering arm member 65 is fixedly secured against the lower portion of the inner face of the support bridge attachment pad 38. The V-shaped cutout 41 provides access clearance for the lower attachment boss 69 in the same manner as the similar cutout provided clearance for the lower boss 51 of the spindle structure 30.

A modification of the steering knuckle assembly 60 is shown in Figure 9 as a steering knuckle assembly 80, comprising a modified wheel support spindle structure 30b and the separable steering arm member 65, together with a modified spindle support bridge 81. The support bridge 81 is the same as the support bridge 29 except for a modified attachment pad 82 which includes an upper pad portion 84 in the same position as the upper portion of the pad 38 and a lower inwardly offset attachment pad portion 85. Bolt apertures 86 are provided through the pad portions 84 and 85 in the same pattern as the bolt apertures 39 through the attachment pads 38.

The spindle structure 30b is the same as the spindle structure 30a except for the provision of a pair of elongated pads 87 formed integrally on the inward face of the spindle structure attachment pad in order to space the steering arm member 65 inwardly therefrom into the same relative position shown in Figure 6.

The steering arm member 65 is retained between the elongated bearing pads 87 and the offset bridge attachment pad portion 85 by means of the lower bolts 76, together with the nut and lock washers 77 and 78, while the upper portions of the two attachment pads are fixedly secured in the same manner as described above by means of the bolts 75. Hence, the steering arm member 65 is firmly held in a yoke-like grip between the support bridge 81 and the spindle structure 30b in order to further insure a strong, rigid attachment to the stud 27 of the lower ball joint 26 of the wheel suspension.

From the above description it will be readily understood that the present invention provides several embodiments of an improved steering knuckle assembly used in an independent steerable wheel suspension in a vehicle. The basic concept of simplicity of construction and ease of assembly is maintained in all of the modification of the steering knuckle. A spindle support bridge containing upper ball joint connection means is formed separately from the wheel support spindle structure including lower ball joint connection means which may be integral or separable. The spindle structure may be provided with a steering arm affixed thereto. Ready access to the surface of the brake backing plate opposing the bridge is provided in all of the modifications either by forming an access aperture in a bridge web, or by forming a relatively narrow reinforcing bridge shank of substantially semicircular cross-section. All of the various steering knuckle components are easily formable as by forging and require a minimum of machining. A substantial advantage is attained in that the connection means for the lower ball joint and the spindle shank, which receive most of the load, are formed as a small compact unit either by forming these portions as integral parts of the spindle structure or by affixing the portions in an efficient manner.

It will be understood that modifications and variations may be effected without departing from the scope of the novel concepts of the present invention.

We claim as our invention:

1. A steering knuckle assembly comprising a spindle support bridge having at its upper end an inwardly extending integral boss and an integral attachment pad at its lower end with integral longitudinal reinforcement ribs extending between the boss and the pad, said boss having a tapered hole therethrough for fixedly receiving the stud of an upper arm ball joint, said attachment pad having two sets of bolt apertures therethrough with a generally V-shaped lower end cutout between the bolt aperture sets, a separable wheel support spindle structure including a sepindle shank and an integral attachment pad at right angles thereto with a plurality of bolt apertures through the pad in a pattern similar to that of the bolt apertures in said support bridge pad, a separable member including a lower boss and an integral steering arm with two bolt apertures arranged to register with the two lowermost bolt apertures in said attachment pads, attachment pins in said bolt apertures fixedly interconnecting said support bridge pad with said spindle structure pad and said member wih said pads, said V-shaped cutout affording access clearance for said lower boss, said lower boss having a tapered hole therethrough for fixedly receiving the stud of a lower arm ball joint in axial alignment with the stud of the upper arm ball joint.

2. In a steering knuckle assembly for an independent wheel suspension, a steering arm member comprising a boss portion, said boss portion having a bolt aperture at each end thereof and a central circular boss with a tapered hole therethrough generally at right angles to the axes of the bolt apertures, and an integral steering arm portion extending from one end of said boss portion roughly perpendicular to the axes of said bolt apertures and said tapered hole, said steering arm portion having an attachment aperture formed near the free end thereof.

3. In an independent wheel suspension, a spindle support bridge comprising a body portion including integrally formed therewith a boss extending substantially perpendicularly thereto at one end, an attachment pad at the other end, a central web and longitudinal reinforcement ribs formed along the edges of said web extending between said boss and said pad, said web having a relatively large longitudinal access opening therethrough said boss having a tapered hole therethrough generally parallel to said body portion, and said attachment pad having two sets of bolt apertures therethrough with a generally V-shaped cutout between the sets of bolt apertures at the end opposite to said boss to permit passage through said bridge of parts secured to said pad.

4. A steering knuckle assembly comprising a spindle support bridge having means at the upper end thereof for pivotal attachment to an upper control arm, said support bridge having an integral attachment pad at its lower end, a separable wheel support spindle structure including a spindle shank and an integral attachment pad, a separable steering arm member having a boss portion with an attachment section at each end thereof and a central circular boss, means fixedly securing said spindle structure pad on one side of said support bridge pad and fixedly securing said steering arm member attachment section to the other side of said support bridge pad, and means for pivotally attaching said boss to a lower control arm, said member having an integral steering arm portion extending from one end of said boss portion roughly perpendicularly to said spindle shank.

5. A steering knuckle assembly comprising a spindle support bridge having means at the upper end thereof for pivotal attachment to an upper control arm, said support bridge having an integral attachment pad portion at its lower end, said attachment pad portion including two integral parallel offset sections, a separable wheel support spindle structure including a spindle shank and an integral attachment pad, a separable steering arm member having a boss portion with an attachment section at each end thereof and a central circular boss, means for fixedly securing one of said bridge attachment pad sections to a portion of said spindle structure attachment pad, means for fixedly interconnecting said member attachment sections with the other of said bridge attachment sections and said spindle structure attachment pad, and means for pivotally attaching said boss to a lower control arm.

References Cited in the file of this patent

UNITED STATES PATENTS

| | | |
|---|---|---|
| 983,855 | Aton | Feb. 7, 1911 |
| 1,617,666 | Cattaneo | Feb. 15, 1927 |
| 2,137,848 | McBeth | Nov. 22, 1938 |
| 2,173,973 | Leighton | Sept. 26, 1939 |
| 2,226,406 | Krotz | Dec. 24, 1940 |
| 2,257,557 | Webb | Sept. 30, 1941 |
| 2,295,913 | Phelps | Sept. 15, 1942 |
| 2,449,306 | Leighton | Sept. 14, 1948 |
| 2,450,322 | Williams | Sept. 28, 1948 |
| 2,521,335 | Booth | Sept. 5, 1950 |
| 2,556,767 | McCann | June 12, 1951 |
| 2,652,264 | Booth et al. | Sept. 15, 1953 |

FOREIGN PATENTS

| | | |
|---|---|---|
| 603,831 | Great Britain | June 23, 1948 |